US012807218B1

(12) United States Patent
Nimura

(10) Patent No.: US 12,807,218 B1
(45) Date of Patent: Nov. 24, 2026

(54) TRACTION MOTOR-BASED CORRECTION OF STEERING MOTOR FAILURE

(71) Applicant: Toyota Research Institute, Inc., Los Altos, CA (US)

(72) Inventor: Kazunori Nimura, Sunnyvale, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 19/282,071

(22) Filed: Jul. 28, 2025

(51) Int. Cl.
*B62D 5/04* (2006.01)
*B60K 1/02* (2006.01)
*B60K 7/00* (2006.01)
*G07C 5/08* (2006.01)

(52) U.S. Cl.
CPC .............. *B62D 5/0484* (2013.01); *B60K 1/02* (2013.01); *B60K 7/0007* (2013.01); *B62D 5/0418* (2013.01); *B62D 5/0487* (2013.01); *G07C 5/0816* (2013.01)

(58) Field of Classification Search
None
See application file for complete search history.

(56) References Cited

U.S. PATENT DOCUMENTS

| | | | | |
|---|---|---|---|---|
| 9,205,760 | B2 | 12/2015 | Makino | |
| 10,202,114 | B2 | 2/2019 | Lian et al. | |
| 10,343,525 | B2 | 7/2019 | Lian et al. | |
| 12,128,876 | B2 | 10/2024 | Zhao et al. | |
| 12,409,692 | B2 * | 9/2025 | Jeon | B60G 3/20 |
| 12,522,290 | B2 * | 1/2026 | Miano | B62D 5/0484 |
| 2023/0042483 | A1 * | 2/2023 | Hanchett | B62D 9/002 |
| 2024/0083427 | A1 | 3/2024 | Salzwedel et al. | |
| 2026/0097804 | A1 * | 4/2026 | Kim | B62D 5/0418 |

FOREIGN PATENT DOCUMENTS

| | | | |
|---|---|---|---|
| CN | 106364481 | A | 2/2017 |
| CN | 111845922 | A | 10/2020 |
| WO | 2022153828 | A1 | 7/2022 |
| WO | 2024174383 | A1 | 8/2024 |

OTHER PUBLICATIONS

Xin et al. "Control strategy for four-wheel independent drive electric vehicles under failure of motor drive systems." Transactions of the Institute of Measurement and Control 38.2 (2016): 129-140.

* cited by examiner

*Primary Examiner* — Todd Melton
(74) *Attorney, Agent, or Firm* — Christopher G. Darrow; Darrow Mustafa PC

(57) ABSTRACT

Systems, methods, and other embodiments described herein relate to correcting wheel yaw responsive to wheel steering motor failure. In one embodiment, a method includes detecting a failure of a steering motor of a wheel of a vehicle. The vehicle has individual wheels driven by respective steering motors and traction motors. The failure alters a wheel yaw. The method also includes determining, responsive to the failure of the steering motor, an adjustment to torque generated by a traction motor of the wheel based on a vehicle characteristic and generating a correct steering torque on the wheel via the traction motor. The corrective steering torque via the traction motor offsets a steering motor failure-induced wheel yaw.

20 Claims, 12 Drawing Sheets

TRACTION MOTOR-BASED CORRECTION OF STEERING MOTOR FAILURE

TECHNICAL FIELD

The subject matter described herein relates, in general, to vehicles with independent in-wheel steering systems and, more particularly, to responding to a steering motor failure by generating a corrective steering torque with a traction motor of a wheel.

BACKGROUND

Traditional steering systems use a mechanical connection between the steering wheel and the steering rack. When a driver turns the wheel, a rack-and-pinion mechanism converts the rotational motion of the steering wheel into linear movement that turns the vehicle wheels. To make steering easier, a motor may assist the steering rack.

In a steer-by-wire system, the direct mechanical connection between the steering wheel and the steering rack is replaced with electronic controls to manage the wheel angle. Specifically, a steering wheel sensor captures the input from the steering wheel. A processor interprets the inputs and sends commands to wheel actuators, which physically turn the vehicle wheels. A feedback mechanism provides tactile feedback to the driver through the steering wheel, simulating the feel of the road. That is, while a computer mediates the steering action, a steer-by-wire system preserves the driver's tactile feedback from the road.

In an independent steering system, each wheel has a dedicated steering motor, enabling individual wheel control. This conserves space due to the absence of a steering rack and provides enhanced vehicle dynamic control. By allowing each wheel to operate independently, an independent steering system can perform complex maneuvers such as crab-walking, tight-radius turns, and neutral spinning turns

SUMMARY

In one embodiment, example systems and methods relate to improving the operation and safety of independently controlled wheels.

In one embodiment, a corrective steering system for correcting for steering wheel failure is disclosed. The corrective steering system includes a processor and a memory storing machine-readable instructions that, when executed by the processor, cause the processor to detect a failure of a steering motor of a wheel of a vehicle that has individual wheels driven by respective steering motors and traction motors. The failure alters a wheel yaw. The memory also stores machine-readable instructions that, when executed by the processor, cause the processor to determine, responsive to the failure of the steering motor, an adjustment to torque generated by a traction motor of the wheel based on a vehicle characteristic. The memory also stores machine-readable instructions that, when executed by the processor, cause the processor to generate a corrective steering torque on the wheel via the traction motor to offset a steering motor failure-induced wheel yaw.

In one embodiment, a non-transitory machine-readable medium for correcting for steering wheel failure is disclosed and including instructions that, when executed by a processor, causes the processor to perform one or more functions is disclosed. The instructions include instructions to detect a failure of a steering motor of a wheel of a vehicle that has individual wheels driven by respective steering motors and traction motors. A yaw pivot point of the wheel is offset from a center point of a wheel contact patch such that the failure alters a wheel yaw. The instructions also include instructions to determine, responsive to the failure of the steering motor, an adjustment to torque generated by a traction motor of the wheel based on a vehicle characteristic. The instructions also include instructions to generate a corrective steering torque on the wheel via the traction motor to offset a steering motor failure-induced wheel yaw.

In one embodiment, a method for correcting for steering wheel failure is disclosed. In one embodiment, the method includes detecting a failure of a steering motor of a wheel of a vehicle that has individual wheels driven by respective steering motors and traction motors. The failure alters a wheel yaw. The method also includes determining, responsive to the failure of the steering motor, an adjustment to torque generated by a traction motor of the wheel based on a vehicle characteristic. The method also includes generating a corrective steering torque on the wheel via the traction motor to offset a steering motor failure-induced wheel yaw.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the operation of vehicles with independent wheel steering systems are disclosed herein. Mechanical steering systems use a mechanical connection between the steering wheel and a steering rack. When a driver rotates the steering wheel, a rack-and-pinion mechanism converts the rotational motion of the steering wheel into a linear movement that steers the vehicle wheels. To make steering easier, a motor may assist the steering rack.

In a mechanical system, each wheel has a steering yaw pivot axis, also known as the kingpin. This pivot point in the suspension allows the front wheels to turn. While older vehicles used a physical kingpin to connect the steering knuckle, which is attached to the wheel hub, to the suspension, other vehicles may use ball joints and control arms instead. However, even in these more modern vehicles, the kingpin axis still exists as an imaginary line around which the wheels pivot. Due to physical constraints, the kingpin may be offset from the radial centerline of the wheel.

Steer-by-wire systems represent a technological advancement where the mechanical connection between the steering wheel and the steering rack is replaced with an electronic connection. Specifically, a steering wheel sensor captures the input from the steering wheel. A processor interprets the inputs and sends commands to wheel actuators, which physically turn the vehicle wheels. A feedback mechanism provides tactile feedback to the driver through the steering wheel, simulating the feel of the road. While a processor mediates the steering action, a steer-by-wire system preserves the driver's tactile feedback from the road via a feedback mechanism. Beyond enhanced control capabilities, steer-by-wire systems also offer the advantage of reduced space requirements by removing the physical connection components between the steering wheel and the steering rack.

Figure 2A:
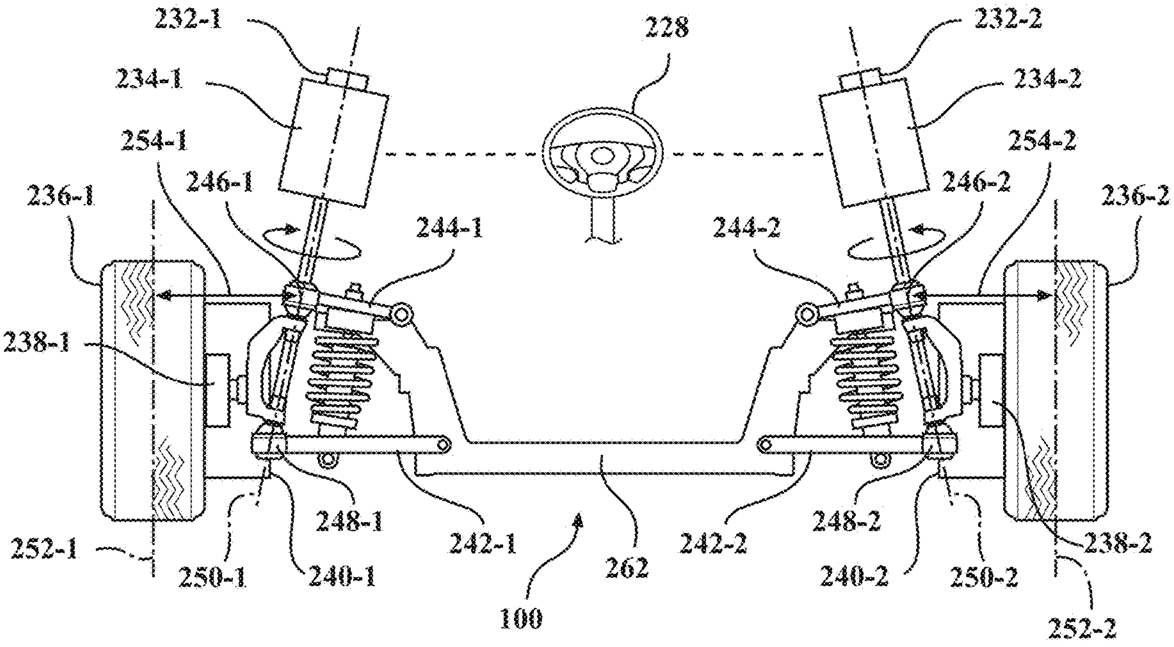
FIGS. 2A and 2B illustrate independent in-wheel steering systems of a vehicle.
Figure 2B:
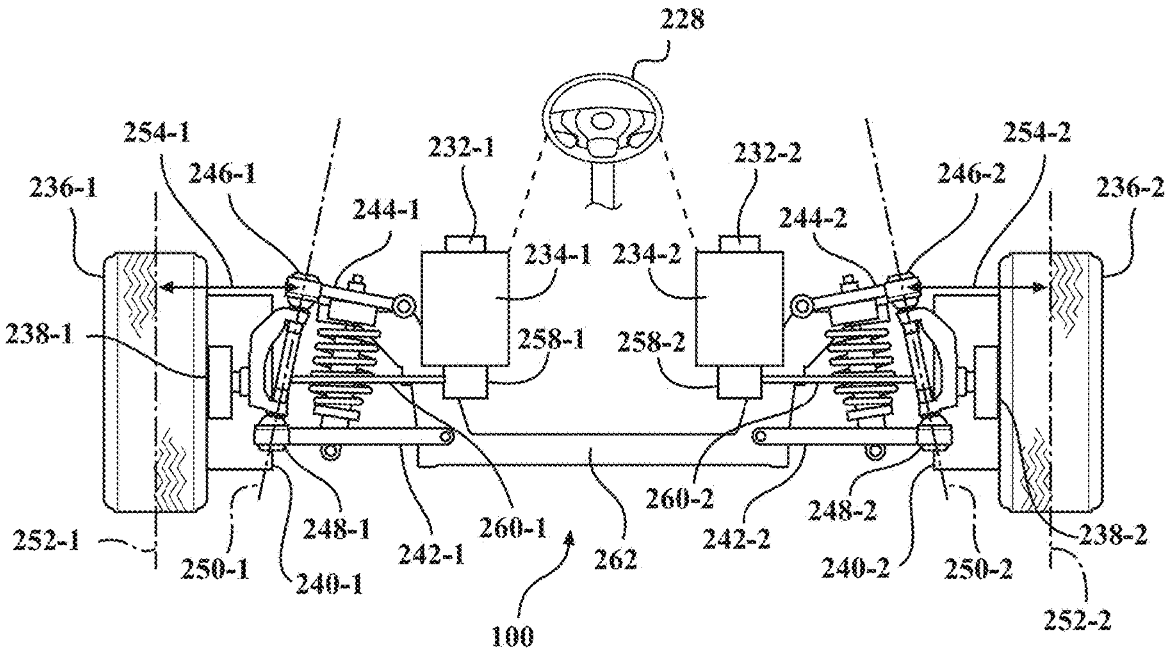

An independent steering system, by comparison, eliminates the steering rack. Instead, each wheel has a dedicated steering motor, located 1) at the kingpin as depicted in FIG. 2A or 2) on the vehicle chassis and linked to the steering knuckle by a tie rod as depicted in FIG. 2B. The independent steering system enables individual wheel control. As depicted below, the independent steering system may include multiple motors per wheel. A first motor, known as a steering motor, may electronically control the steering angle of the wheel, while a second motor, referred to as a traction motor, provides propulsion to the wheel. In either case, one or both of these motors may be situated within or near the controlled wheel.

An independent steering system provides space savings by eliminating a steering rack and offers enhanced vehicle dynamics control. By allowing each wheel to operate independently, an independent steering system can perform complex maneuvers such as crab walking, tight-radius turns, and neutral-spinning turns. Thus, independent wheel systems may lead to improved vehicle maneuverability. Independent steering systems, by relocating powertrain elements to wheel hubs, may lead to more versatile interiors. Moreover, integrating steering and propulsion within the wheel module simplifies vehicle design, reduces mechanical complexity, and offers potential energy efficiency gains through optimized torque distribution and regenerative braking.

However, independent steering systems present a challenge in the event of motor failure. Unlike traditional systems with a direct linkage, independent systems control each wheel separately. This lack of mechanical connection means that when a motor fails, there may not be a mechanism to maintain wheel stability or return the wheels to a neutral position. Specifically, an independent steering system may be vulnerable to unintended wheel rotation about a yaw axis. That is, as depicted in the figures below, the wheel's axis of rotation (i.e., kingpin) may be offset from the contact patch of the wheel to the ground. Due to this offset, natural physical forces acting on the wheel may induce a yaw moment, causing the wheel to rotate outward (i.e., toe out) or inward (i.e., toe in).

To counter this physical force-inducing yaw moment, the steering motor may be continually active to provide nuanced steering controls. Specifically, the steering motor may provide precisely regulated torque that dynamically adjusts the torque value based on a variety of parameters, including 1) steering angle and speed, 2) vehicle mass, 3) tire characteristics, 4) kingpin offset, 5) suspension caster, and 6) road surface conditions. A steering motor controller, incorporating feedforward and feedback control mechanisms, a servo controller, and a steering angle sensor, manages this process. The steering motor controller employs a model to estimate the steering motor torque based on the desired steering angle and refines this estimation using real-time feedback from the steering angle sensor.

A failure of the steering motor may result in physical force-induced yaw, causing the tires to drift into a toe-out or toe-in orientation without correction. That is, if the steering motor fails, acceleration or brake torque, as well as frictional forces with the ground, may cause the wheel to rotate about the kingpin line due to the kingpin offset. This can lead to unpredictable wheel behavior, vehicle instability, reduced vehicle control, and perhaps increased risk to the vehicle and passengers.

Accordingly, the present corrective steering system addresses these and other issues related to independent steering systems in vehicles with in-wheel motors, with a focus on failures of the steering motor. Specifically, the system utilizes the traction motor, which is otherwise used to propel the vehicle and wheels forward, for steering the respective wheels in situations where a steering motor for the wheel has failed. This system utilizes the kingpin offset to generate corrective steering torque in the event of a steering motor failure. That is, the increased/decreased traction motor torque, which is offset from the wheel's rotational axis (i.e., the kingpin), generates a yaw moment that offsets the physical force-induced wheel yaw moment. Put another way, the present corrective steering system compensates for the tendency of a wheel to drift or self-steer under physical forces, which is uncorrected when a steering motor of the wheel fails. The corrective steering system detects a failure of the steering motor of the individual wheel. Responsive to this detected failure, the system controls the traction motor of the same wheel to rotate faster or slower than those of other wheels. This speed differential enables the individual wheel to assist in steering the vehicle as intended.

Thus, the traction motor, in addition to providing propulsion to the vehicle, may provide supplementary steering if the primary steering motor fails. This provides a safety redundancy by repurposing an existing powertrain component to offer limited steering control during a system malfunction.

Figure 1:
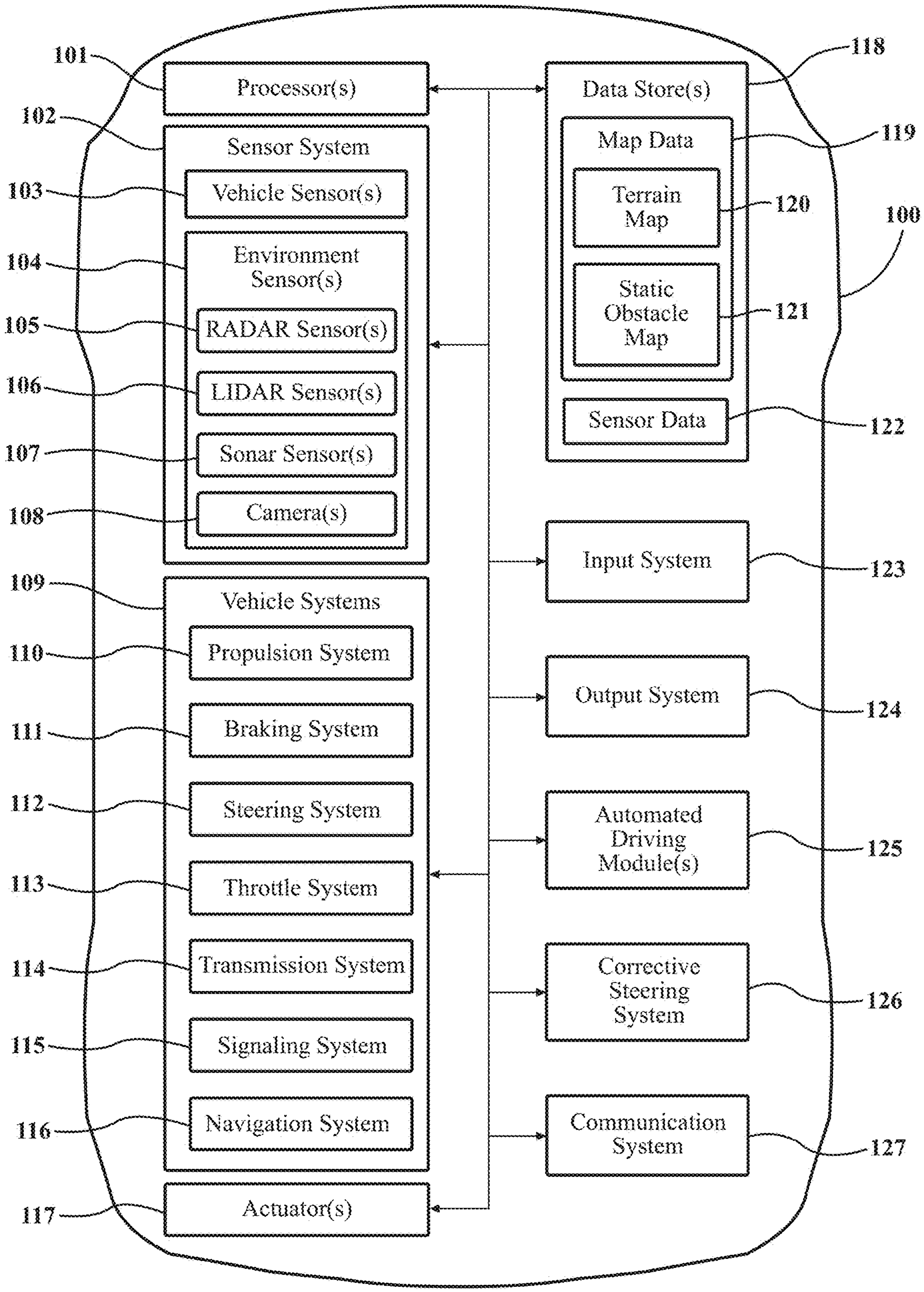
FIG. 1 illustrates one embodiment of a vehicle within which systems and methods disclosed herein may be implemented.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes multiple wheels where each wheel is individually controlled.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle, while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2A-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a corrective steering system 126 that is implemented to perform methods and other functions as disclosed herein relating to improving the steering of vehicle wheels, where each wheel is independently controlled.

Moreover, the vehicle may include a communication system 127. In one embodiment, the communication system 127 communicates according to one or more communication standards. For example, the communication system 127 can include multiple different antennas/transceivers and/or other hardware elements for communicating at different frequencies and according to respective protocols. The communication system 127, in one arrangement, communicates via a communication protocol, such as WiFi, DSRC, V2I, V2V, or another suitable protocol for communicating between the vehicle 100 and other entities in the cloud environment. Moreover, the communication system 127, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the corrective steering system 126 can leverage various wireless communication technologies to provide communications to other entities, such as members of the cloud-computing environment.

FIGS. 2A and 2B illustrate independent in-wheel steering systems of a vehicle 100. As described above, in an independent steering system, each wheel 236-1 and 236-2 may be independently provided with steering commands and propulsion commands. Specifically, each wheel 236-1 and 236-2 may be controlled by a respective steering motor 234-1 and 234-2 and a respective traction motor 238-1 and 238-2. In the present specification, the identifier "-*" may indicate a particular instance of an element, while the lack of such generally refers to the element.

The steering motors 234 may include electric motors, such as servos and stepper motors, that physically turn the respective wheel 236 to a desired angle about a vertical axis. The steering motors 234 may be mounted to the suspension as depicted in FIG. 2A, for example, along the kingpin 250-1 and 250-2 lines, or on the vehicle chassis 262 as depicted in FIG. 2B. In the latter case, the steering motor 234 may be coupled to the respective steering knuckles 240-1 and 240-2 via a steering gearbox 258-1 and 258-2 and a tie rod 260-1 and 260-2.

The commands to the steering motors 234 may be provided via a steering wheel 228, as indicated by the dashed lines, or, in the case of an autonomous vehicle equipped with ADAS, via an automated driving module 125.

The traction motors 238 provide propulsion to a respective wheel 236. That is, the traction motors 238 provide a torque that causes the respective wheel 236 to rotate. As depicted in FIGS. 2A, 2B, and others, the traction motors 238 may be in-wheel motors or near-wheel motors. Note that while FIGS. 2A and 2B depict a vehicle 100 that includes a right front steering motor 234-1, a right front traction motor 238-1, a left front steering motor 234-2, and a left front traction motor 238-2, the vehicle 100 may be equipped with similar dual-motor controls for each of the rear wheels. That is, the corrective steering system of the present specification may be a two-wheel control system or a four-wheel control system.

As depicted in FIGS. 2A and 2B, the vehicle chassis 262 may be coupled to the respective wheels 236 via upper control arms 244-1 and 244-2 and lower control arms 242-1 and 242-2. Specifically, these control arms 244 and 242 may connect to a respective steering knuckle 240-1 and 240-2, which serves as a connection point between the vehicle chassis 262, suspension system, and a wheel hub, which wheel hub may include the traction motors 238 and the brakes of the wheel 236. To facilitate the multi-directional movement of the wheels 236 relative to the vehicle chassis 262, each control arm 244 and 242 may be connected to the respective steering knuckle 240 via respective upper ball joints 246-1 and 246-2 and lower ball joints 248-1 and 248-2. The line through these ball joints 246 and 248 may represent the yaw axis, or kingpin 250-1 and 250-2, of the respective wheel 236-1 and 236-2. That is, it is about this axis that the wheels 236 turn to the left or right, responsive to a turn input from the steering wheel 228 or the automated driving module 125.

As depicted in FIGS. 2A and 2B, the kingpin 250 is offset from the centerline 252-1 and 252-2 of the respective contact patches of the wheels 236-1 and 236-2. That is, the yaw pivot point of the wheel 236 (i.e., the kingpin 250) is offset from the center point of a wheel contact patch. This kingpin offset 254-1 and 254-2 may induce a torque on the wheel 236 that generates a wheel yaw. This yaw moment is either countered by the operation of the respective steering motor 234 or causes the respective wheel 236 to change orientation as depicted in FIGS. 4A-6B.

The steering motor 234 may be controlled by a controller that regulates the steering motor 234 to provide the respective wheel 236 with a specific amount of torque. For example, as a driver turns the steering wheel 228 by a certain amount (e.g., to effectuate a 90-degree turn of the vehicle or to drive along a curved road), the controller may supply the steering motor 234-1 with an amount of electrical current. The amount of electrical current is predetermined, based on vehicle characteristics, to provide precisely regulated torque to turn the respective wheel 236 in an amount that maps to the steering wheel 228 or ADAS input. As described above, this mapping may be based on a variety of parameters, including 1) steering angle, 2) speed, 3) vehicle mass, 4) tire characteristics, 5) kingpin offset, 6) suspension caster, and 7) road surface conditions, among others.

Figure 4A:
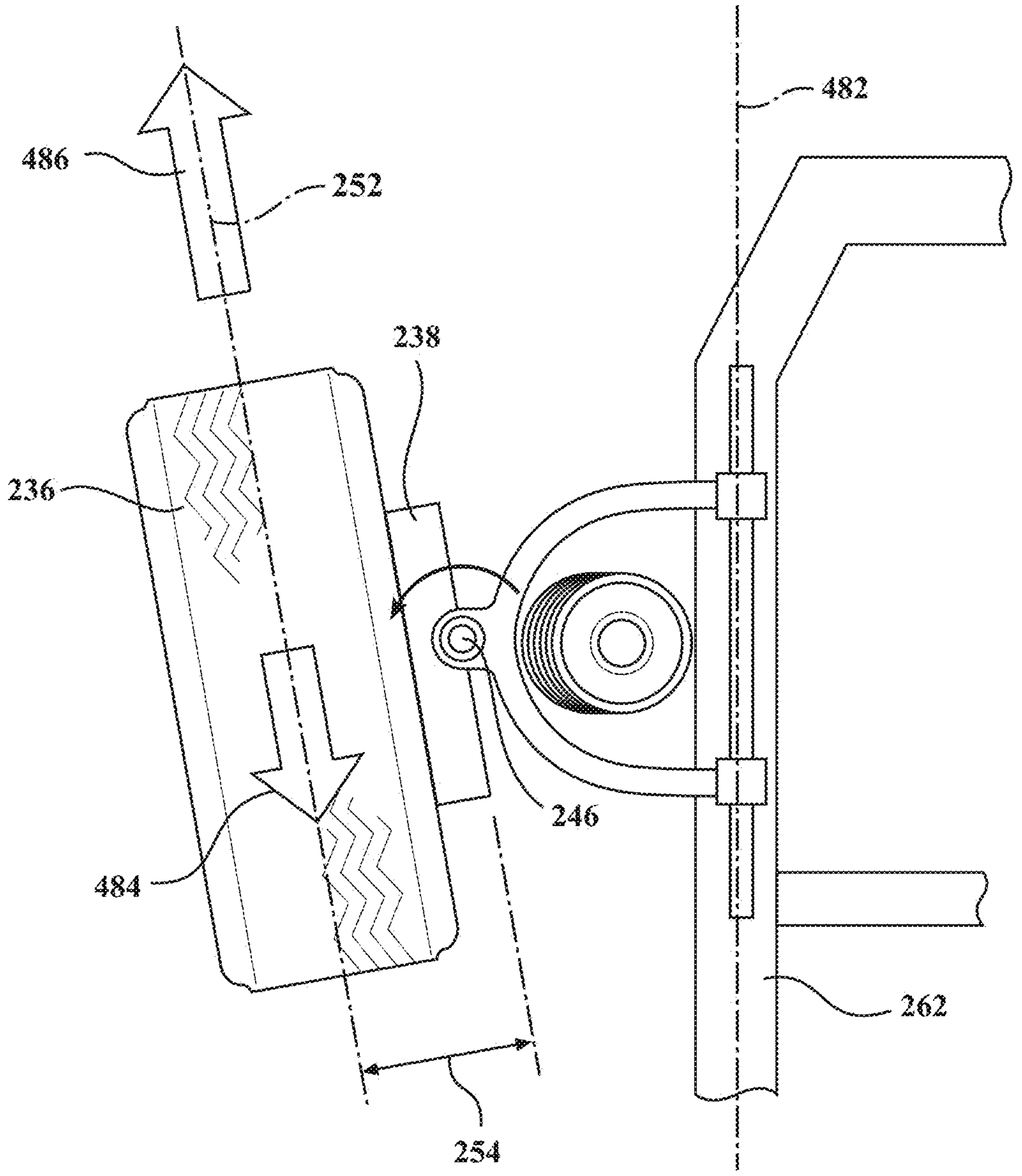
FIGS. 4A and 4B illustrate the correction, by a corrective steering system, of an independent in-wheel steering system following the failure of a steering motor.
Figure 5A:
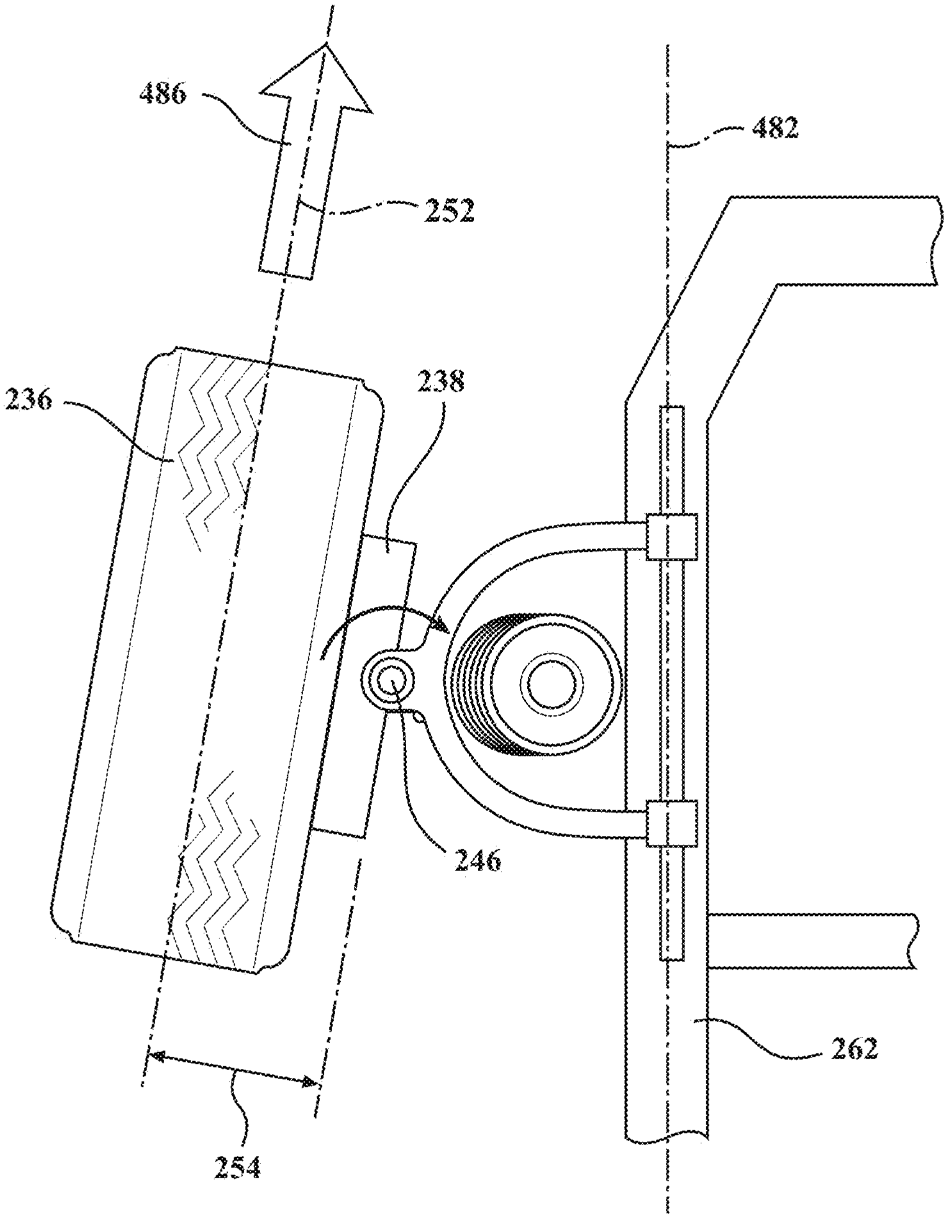
FIGS. 5A and 5B illustrate the correction, by a corrective steering system, of an independent in-wheel steering system following the failure of a steering motor.

Even when driving straight, the steering motors 234 may be actively providing a torque to the respective wheels 236. For example, as described above, physical forces acting on the respective wheels 236 may cause the wheels 236 to rotate or become misaligned with the direction of travel of the vehicle 100, the longitudinal axis of the vehicle 100, and/or the desired orientation of the wheel 236. For example, as depicted in FIG. 4A, frictional forces acting on the wheels 236 of a vehicle 100 driving at a constant speed may cause the wheels 236 to tend towards a "toe out" configuration where the fronts of the wheels 236 are turned away from the longitudinal axis of the vehicle 100. By comparison, as depicted in FIG. 5A, when accelerating, physical forces acting on the wheels 236 may cause the wheels 236 to tend towards a "toe in" configuration where the fronts of the wheels 236 are turned toward the longitudinal axis of the vehicle 100. Accordingly, the steering motors 234 may be pre-programmed to provide a certain steering torque to the wheels 236 to counter these physical force induced configurations and maintain the wheels 236 in an orientation that aligns with the vehicle's longitudinal axis, direction of travel, or a desired orientation of the wheels 236 as defined by the steering wheel 228, ADAS, or other vehicle system.

However, in some circumstances, the steering motor 234 may fail, which 1) impacts the ability of the driver to steer the vehicle 100 in a particular way and 2) removes the torque that counters the physical force-induced yaw moment of the wheel 236. Accordingly, as described below in connection with FIG. 3, the corrective steering system 126 controls the traction motor 238 to counter the physical force-induced yaw moment of the wheel 236, an action otherwise performed by the steering motor 234. Specifically, the corrective steering system 126 detects when a steering motor 234 has failed. In one example, to detect this failure, the corrective steering system 126 may include a steering angle sensor 232-1 and 232-2 for each respective steering motor 234-1 and 234-2. In general, the steering angle sensor 232 detects the angle of the steering motor 234, which may also map to the angle of the respective wheel 236. That is, the steering motor 234 may rotate responsive to a steering input, which rotation of the steering motor 234 causes the respective wheel 236 to rotate about a yaw axis.

As a specific example, in response to a steering input at the steering wheel 228 to turn the wheels 236 to follow a gently curving right-hand banked road, the steering motor 234 may rotate by an amount of 1° to the right, which causes the respective wheel 236 to rotate by 1° to the right. The steering angle sensor 232 may be an angular sensor using an encoder, Hall effect sensor, or a resolver or any other device mounted to the steering motor 234 that can determine this angle of rotation, mounted to the steering motor 234.

In an example, the output of this steering angle sensor 232 may be used to determine when the steering motor 234 has failed. For example, the steering angle sensor 232 may indicate the actual angle of the steering motor 234. Moreover, a steering input command may map to a target angle of the steering motor 234. For example, to effectuate a particular right-hand turn maneuver, the target position of the steering motor 234 may be 5° to the right. If the output of the steering angle sensor 232 deviates from this target value (i.e., 5° to the right) by some threshold, then the corrective steering system 126 may determine that the steering motor 234 has failed and that remedial action (i.e., provision of a corrective steering torque by the respective traction motor 238) is warranted.

As another example, when driving straight, it may be expected that the wheel 236 and the steering motor 234 have a degree of rotation of 0 as measured from a longitudinal axis of the vehicle 100. Note that, as described above, when driving straight, the biased position of the wheel 236 may be other than 0°. Accordingly, the steering motor 234 may be provided with an electrical current to hold the steering motor 234 and wheel 236 at the 0° orientation. That is to say, the steering angle sensor 232 does not determine whether the steering motor 234 is active (i.e., actively controlling the angle of the wheel 236), but rather what its angular position is.

If the output of the steering angle sensor 232 deviates from this target value (i.e., 0° with reference to the longitudinal axis of the vehicle) by some threshold, then the corrective steering system 126 may determine that the steering motor 234 has failed and that remedial action (i.e., provision of a corrective steering torque by the respective traction motor 238) is warranted.

Figure 3:
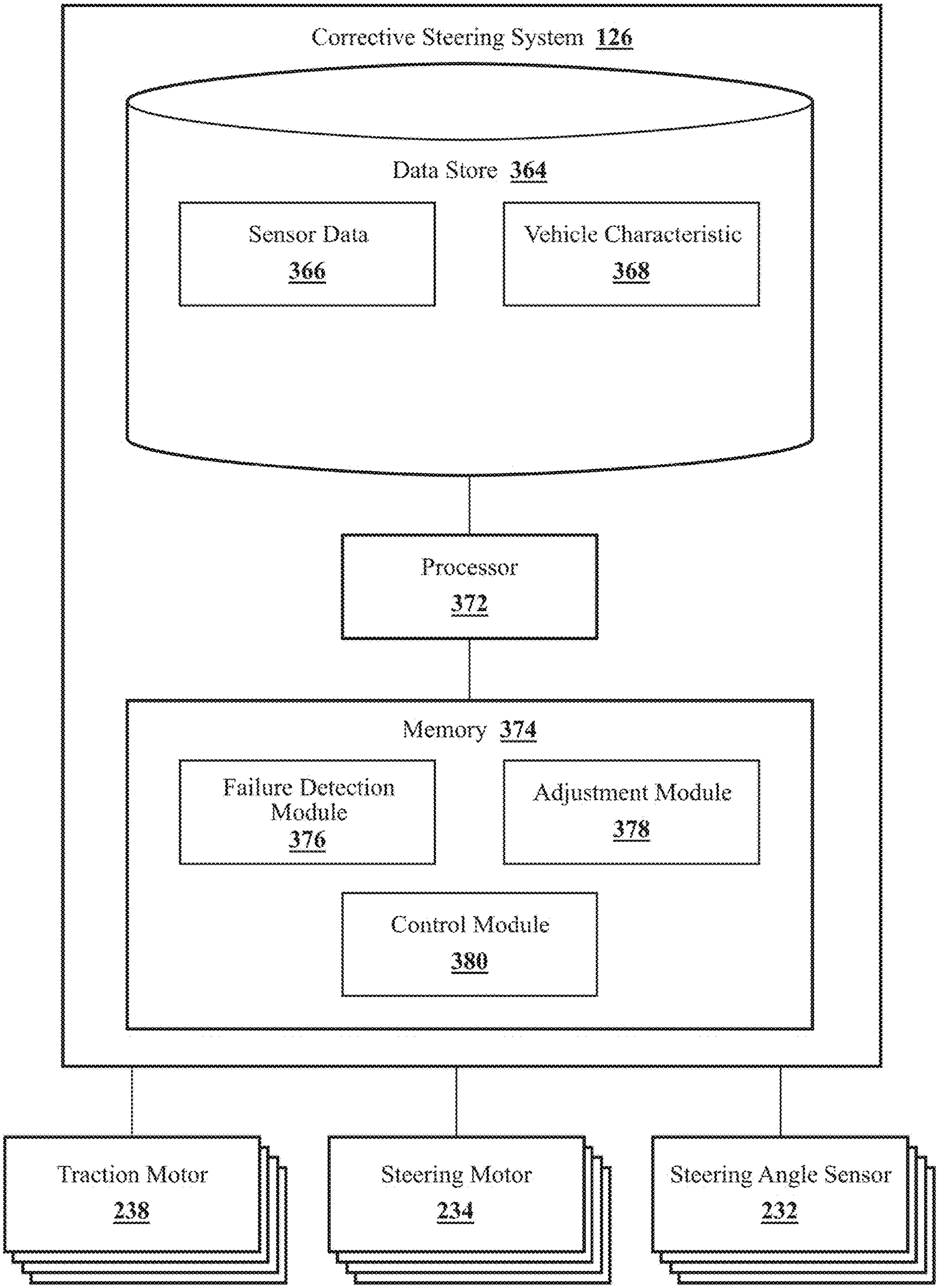
FIG. 3 illustrates one embodiment of a corrective steering system that is associated with traction motor-based correction of a steering motor failure.

FIG. 3 illustrates one embodiment of a corrective steering system 126 that is associated with traction motor-based correction of a steering motor failure. The corrective steering system 126 is shown as including a processor 372. In an example, the processor 372 may be a part of the corrective steering system 126, separate from the processor 101 of the vehicle 100, or the corrective steering system 126 may access the processor 101 through a data bus or another communication path. In one embodiment, the corrective steering system 126 includes a memory 374 that stores a failure detection module 376, an adjustment module 378, and a control module 380. The memory 374 is a random-access memory (RAM), read-only memory (ROM), a hard-disk drive, a flash memory, or another suitable memory for storing the modules 376, 378, and 380. The modules 376, 378, and 380 are, for example, machine-readable instructions that, when executed by the processor 372, cause the processor 372 to perform the various functions disclosed herein. In alternative arrangements, the modules 376, 378, and 380 are independent elements from the memory 374 that are, for example, comprised of hardware elements. Thus, the modules 376, 378, and 380 are alternatively application-specific integrated circuits (ASICs), hardware-based controllers, a composition of logic gates, or another hardware-based solution.

Moreover, in one embodiment, the corrective steering system 126 includes the data store 364. The data store 364 is, in one embodiment, an electronic data structure stored in the memory 374 or another data storage device and that is configured with routines that can be executed by the processor 372 for analyzing stored data, providing stored data, organizing stored data, and so on. Thus, in one embodiment, the data store 364 stores data used by the modules 376, 378, and 380 in executing various functions. In an example, the data store 364 may be the data store 118 of the vehicle or may be a separate data store specifically used by the corrective steering system 126.

As depicted, the data store 364 may include sensor data 366, which the corrective steering system 126 relies on to detect a failure of the steering motor 234 and dictate the control parameters for the corrective steering provided by the traction motor 238. Specifically, as described above, the failure detection module 376 may determine that a steering motor 234 has failed when the actual steering motor angle differs from the target steering motor angle by a threshold amount. Accordingly, the sensor data 366 may include the output of various steering angle sensors 232, whether there are two steering angle sensors 232 (e.g., for a vehicle 100 with front wheels that are independently steerable and rear wheels that are not) or four steering angle sensors 232 (e.g., for a vehicle 100 with front wheels and rear wheels that are independently steerable). In an example, the output of the steering angle sensor 232 may be an angular position, as measured from some reference axis, such as a longitudinal axis of the vehicle 100. That is, the sensor data 366 may include angular measurement values output by any number of steering angle sensors 232.

Further, the amount of additional torque provided by the traction motor 238 to provide the corrective action may be based on vehicle characteristics 368 as described below, or other real-time driving conditions. For example, the amount of corrective torque may be based on the speed of the vehicle 100, the steering input of the vehicle, or road surface conditions. Accordingly, the sensor data 366 may include data collected from various vehicle sensors 103 and environment sensors 104 that collect data regarding the state of environmental conditions and vehicle conditions.

As another specific example, the amount of torque provided by the traction motor 238 may be determined, at least in part, based on the amount of torque provided by the steering motor 234. Accordingly, in this example, the corrective steering system 126 may be in electronic communication (whether wired or wireless) with the steering motor 234 to acquire steering motor data such as the torque provided by the steering motor 234.

In some examples, the corrective steering torque is supplemental to the torque already provided by the traction motor 238. For example, while driving, traction motors 238 for the various wheels 236 are actively providing propulsive power to the wheels 236. Accordingly, rather than dictating the overall torque provided by a traction motor 238 that corresponds to a failed steering motor 234, the corrective steering torque may be a supplemental amount to be added to the propulsive traction motor torque. In this example, the corrective steering system 126 may be in electronic communication (whether wired or wireless) with the traction motor 238 to 1) trigger the provision of additional torque and 2) extract traction motor torque sensor data 366, such that the corrective steering torque may be supplemented accordingly.

In one embodiment, the data store 364 stores the sensor data 366 along with, for example, metadata that characterizes various aspects of the sensor data 366. For example, the metadata can include time/date stamps from when the separate sensor data 366 was generated, and so on.

In one embodiment, the data store 364 further includes vehicle characteristics 368. In addition to being dependent upon various dynamic characteristics (e.g., speed, road conditions, steering wheel 228 input), the amount of corrective steering torque to be provided by the traction motor 238 may depend on various static vehicle characteristics 368. One specific example is the kingpin offset 254. For example, for a larger kingpin offset 254, a reduced corrective steering torque may be used to offset the greater yaw force. As another example, the radius of the wheel 236 may alter the yaw moment and yaw force. For example, a wheel 236 with a larger radius may trigger a larger corrective steering torque to offset a larger yaw force. Accordingly, in either of these examples, the data store 364 may include vehicle characteristics 368 for the vehicle 100 such that an accurate generation of a corrective steering torque may be determined. Other examples of vehicle characteristics 368 that may define the corrective steering torque generation may include, but are not limited to, vehicle mass, tire classification, and wheel caster angle. Note that while particular reference is made to particular vehicle characteristics 368, other vehicle characteristics 368 may be stored in the data store 364 and relied on in various ways by the corrective steering system 126.

The corrective steering system 126 also includes various modules 376, 378, and 380 to carry out the traction motor-provided corrective steering. Specifically, the corrective steering system 126 includes a failure detection module 376 that, in one embodiment, includes instructions that cause the processor 372 to detect a failure of a steering motor 234 of a wheel 236 of a vehicle 100 that has individual wheels 236 driven by respective steering motors 23 and traction motors 238. As described above, due to the yaw pivot point of the wheel (i.e., the kingpin 250 line) being offset from the centerline 252 of a wheel contact patch, the failure of the steering motor 234 alters a wheel yaw. Specifically, depending on various conditions, the front of a wheel 236 May 1) point away from the longitudinal axis of the vehicle 100 as depicted in FIG. 4A, which may be referred to as a toe-out orientation, or 2) point toward the longitudinal axis of the vehicle 100 as depicted in FIG. 5A, which may be referred to as a toe-in orientation.

As described above, in an example, the failure detection module 376 includes instructions that cause the processor 372 to detect the failure of the steering motor 234 by comparing a measured steering motor angle to a target steering motor angle and determining that the measured steering motor angle is a threshold amount different from the target steering motor angle. In an example, the target steering motor angle may be determined based on various inputs such as a steering wheel 228 command or an ADAS command. For example, when the steering wheel 228 is in a neutral orientation, such as when driving straight, the target steering motor angle may be 0°. By comparison, when the vehicle 100 is driving through a curve on the road, the target steering angle may be some non-zero number that is defined in part by the amount of rotation of the steering wheel 228. The measured steering motor angle by comparison is determined by a steering angle sensor 232 mounted to the steering motor 234. When operating as expected, the measured steering angle may match or be within a threshold range (e.g., 1%, 2%, 3%, 5%, 10%, or 20%) of the target steering angle. If the measured steering angle is different from the target steering angle by more than any predetermined amount (i.e., more than any predetermined percentage or numerical value), the failure detection module 376 may categorize the steering motor 234 as being in a failed condition. Accordingly, the failure detection module 376 may include comparison circuitry to compare the measured steering angle and target steering angle to determine a steering motor 234 failure.

The corrective steering system 126 also includes an adjustment module 378, which contains instructions that cause the processor 372 to determine, in response to the failure of the steering motor 234, an adjustment to the torque generated by the traction motor 238 of the wheel 236. The adjustment is based on a vehicle characteristic. As described above, the traction motor 238 may already be providing torque to the wheel 236 (i.e., the vehicle 100 is in motion) or not (i.e., the vehicle 100 is starting from a stationary position). In either case, the adjustment module 378 determines an additional amount of torque to provide to the wheel 236 through the traction motor 238 to offset any physical force-induced yaw that would otherwise be offset by the steering motor 234 operation.

Figure 9:
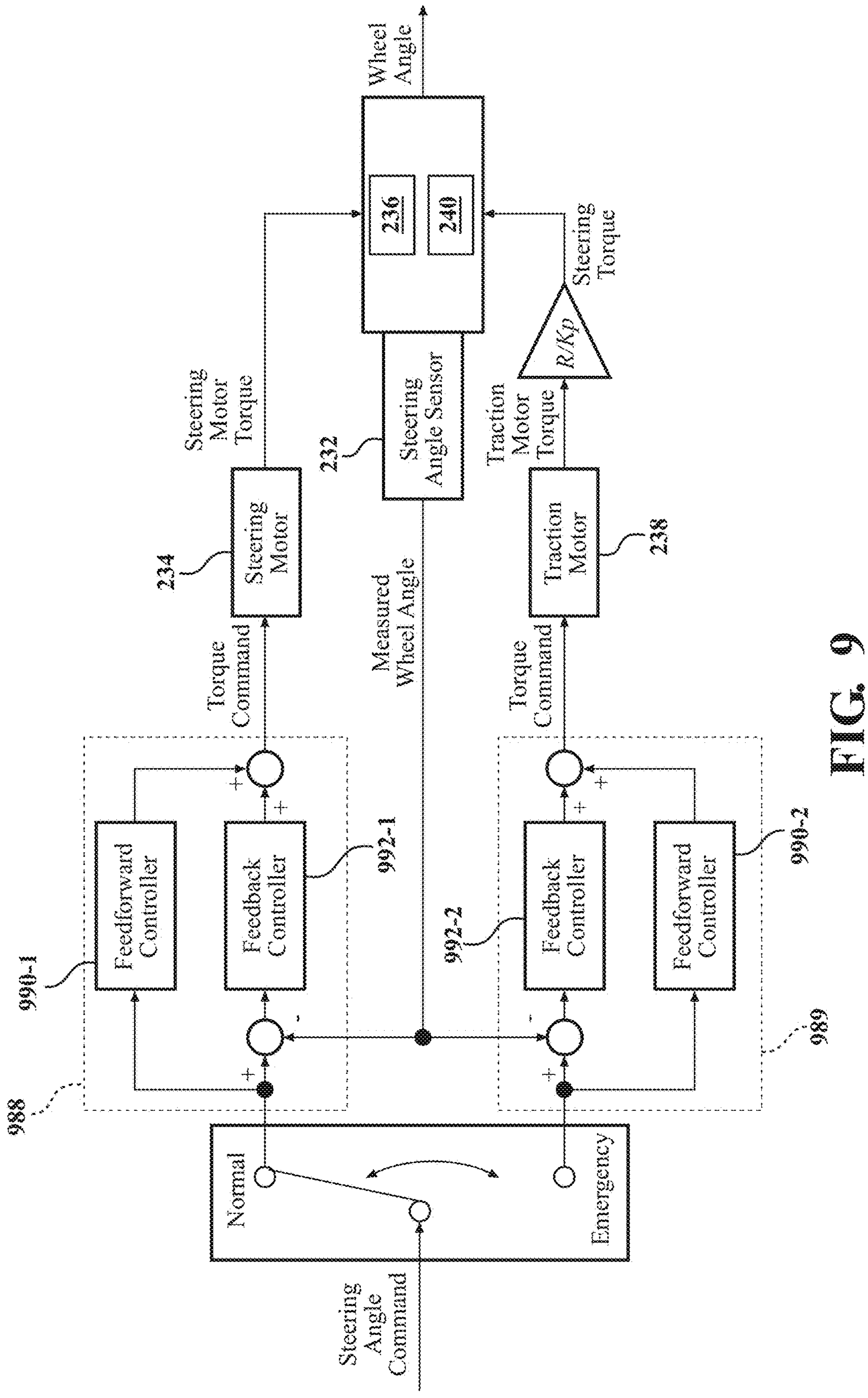
FIG. 9 illustrates a corrective steering system that is associated with traction motor-based correction of a steering motor failure.

In an example, the adjustment module 378 causes the processor 372 to determine the adjustment amount based on a closed-loop feedback control system, such as that depicted in FIG. 9. In this example, the adjustment module 378 may calculate a target torque or current command based on target and measured motor angles. This target torque may be vehicle-specific, for example, based on the specific kingpin offset 254 of a vehicle 100 and the radius of a wheel 236. In an example, to implement the backup steering, the adjustment module 378 determines the corrective steering torque from the traction motor 238 based on the torque demands of the steering motor 234 and subsequently converts it into the corresponding torque value for the traction motor 238. In one specific example, the traction motor torque may be defined based on the following equation.

$$T_{tm} = T_{sm}\left(\frac{R}{K_p}\right). \quad \text{Equation (1)}$$

That is, in one example, the traction motor torque may be determined based on Equation (1). In Equation (1), $T_{tm}$ is the traction motor torque, $T_{sm}$ is the steering motor torque, R is the wheel radius, and $K_p$ is the kingpin offset.

The corrective steering system 126 further includes a control module 380 that includes instructions that cause the processor 372 to generate the corrective steering torque on the wheel 236 via the traction motor 238 to offset a steering motor failure-induced wheel yaw. That is, the control module 380 may transmit an electronic command signal to the traction motor 238, which electronic command signal increases or decreases the amount of torque provided by the traction motor 238, which increased or decreased amount is based on different characteristics such as the direction of the deviation of the wheel yaw (e.g., toe in or toe out) from the target yaw, the kingpin offset 254, and other vehicle characteristics 368 and sensor data 366 as described above. As described above, the amount of torque change provided by the traction motor 238 may be determined by the adjustment module 378.

In one example, the control module 380 includes instructions that cause the processor 372 to incrementally alter the torque of the traction motor 238 until the measured steering motor angle (as determined by the respective steering angle sensor 232) converges towards, and ultimately is within a threshold range of, the target steering motor angle. That is, as the torque provided by the traction motor 238 is adjusted, the wheel 236 and the steering motor 234 may change their orientation towards the target steering motor angle. Accordingly, in this example, the failure detection module 376 may determine whether the torque provided by the traction motor 238 should be increased or decreased (i.e., the deviation from the target steering angle is positive or negative). Based on the sign of the deviation, the adjustment module 378 may prescribe an increase or decrease in the amount of torque provided by the traction motor 238. The control module 380 may incrementally increase or decrease the torque as prescribed until the respective steering angle sensor 232 outputs a reading that is within a threshold range of the target amount.

Accordingly, the corrective steering system 126 provides steering control to individually controlled wheels, even when a steering motor 234 fails. This provides a backup steering system to independently driven wheels, thus promoting safe redundancy within the independent steering system.

Figure 4B:
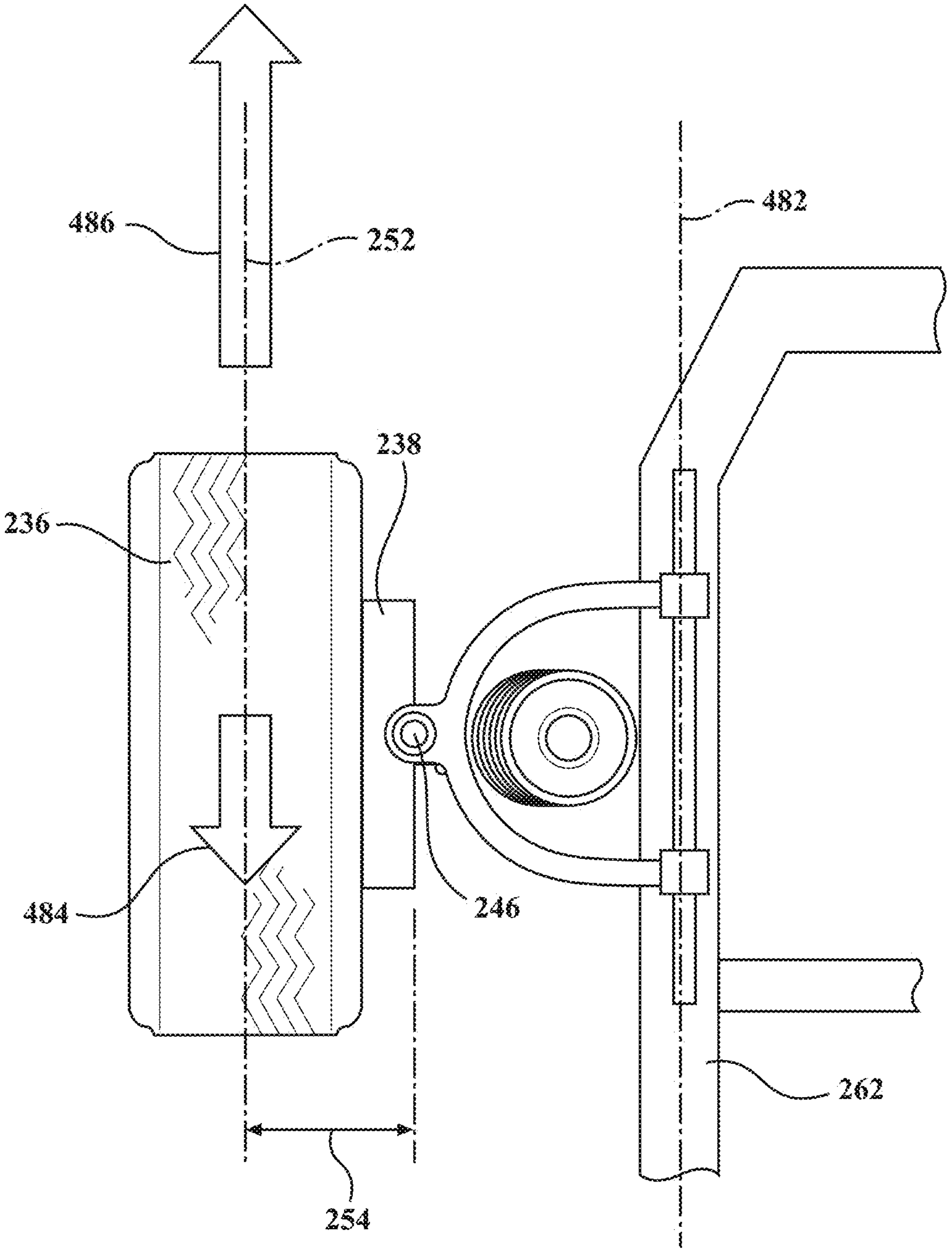

FIGS. 4A and 4B illustrate the correction, by a corrective steering system 126, of an independent in-wheel steering system following the failure of a steering motor 234. Specifically, FIG. 4A depicts a scenario where the wheel 236 is in a toe-out orientation, with the front of the wheel 236 pointing away from the longitudinal axis 482 of the vehicle chassis 262. This may occur when the vehicle 100 is driving forward at constant speed or when a braking pressure is applied to the wheel 236. For example, while driving forward, the traction motor may be applying a forward torque as indicated by the arrow 486. However, under natural driving conditions, a friction force, indicated by the arrow 484, acts against the wheel 236. This force generates an induced torque that may result in the wheel being toe out, with the front of the wheel 236 pointed away from the longitudinal axis 482 of the vehicle chassis 262. When operating correctly, the steering motor 234 may account for this tendency by applying a steering force towards the longitudinal axis 482. However, when the steering motor fails 234, this induced torque may not be corrected, which could lead to vehicle instability and an unsafe driving condition.

To counter this force, as indicated in FIG. 4B, the corrective steering system 126 may increase the amount of torque provided by the traction motor 238 as depicted in FIG. 4B with a larger arrow 486. This may cause this wheel 236 to rotate faster than the other wheels. Due to the kingpin offset 254, this may cause the wheel yaw to realign toward the vehicle yaw. Specifically, increasing the speed of one wheel 236 may cause that wheel 236 to rotate about a yaw axis, i.e., a vertical axis through the ball joint 246. That is, the corrective steering system 126 may cause the processor 372 to generate the corrective steering torque to be provided by the traction motor 238 such that the wheel yaw aligns towards the vehicle yaw. In the specific example depicted in FIGS. 4A and 4B, the corrective steering system 126 may cause the processor 372 to increase the torque to the wheel via the traction motor 238 in response to the failure of the steering motor 234, which failure has caused the front of the wheel 236 to point away from the longitudinal axis 482 of the vehicle 100. Note that as depicted in FIGS. 4A and 4B, the corrective steering torque may be in addition to the torque already provided by the traction motor 238, as indicated by the lengthening of the arrow 486 representing the torque provided by the traction motor 238.

Figure 5B:
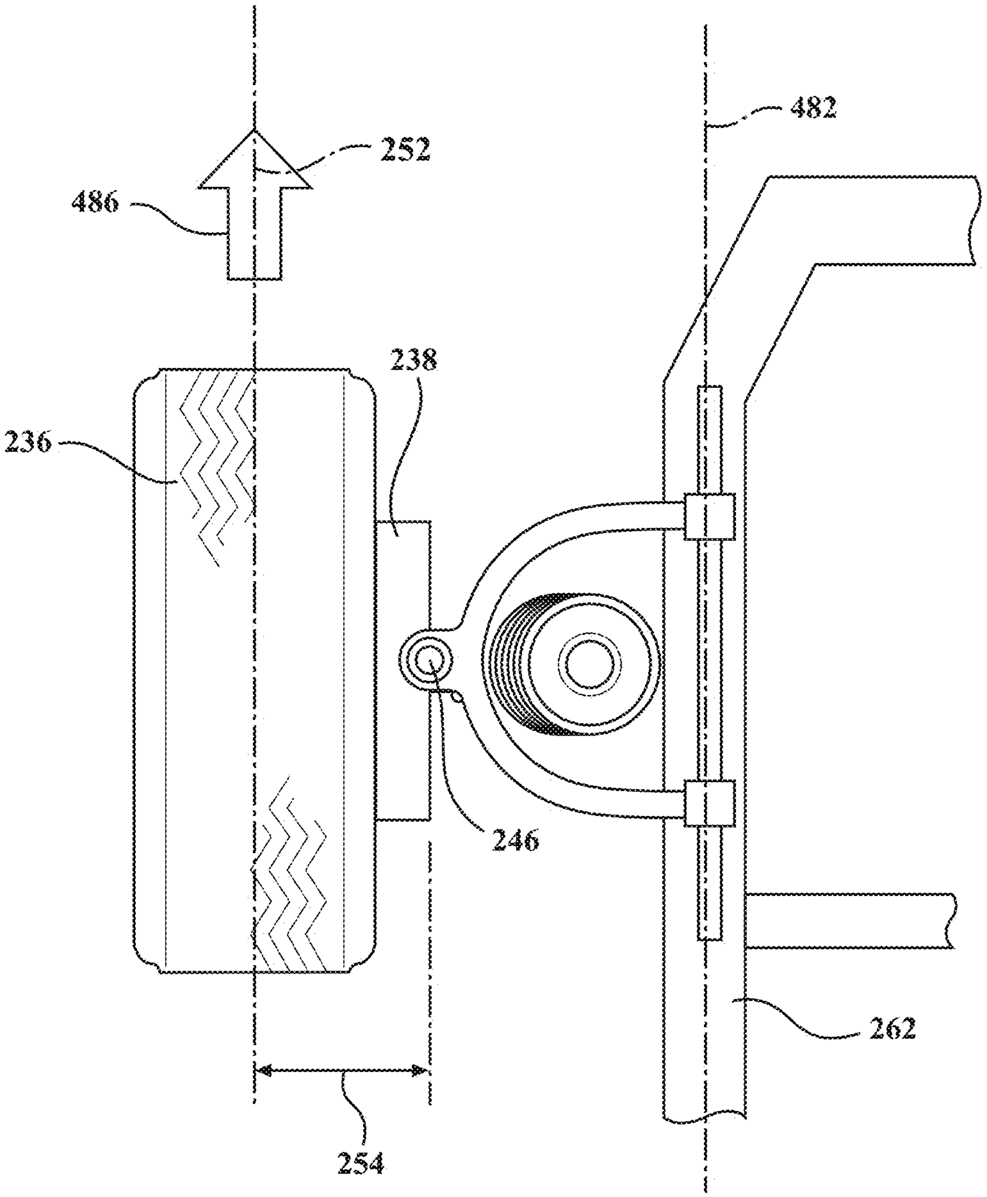

FIGS. 5A and 5B illustrate the correction, by a corrective steering system 126, of an independent in-wheel steering system following the failure of a steering motor 234. Specifically, FIG. 5A depicts a scenario where the wheel 236 is in a toe-in orientation, with the front of the wheel 236 pointing toward the longitudinal axis 482 of the vehicle chassis 262. This may occur when the vehicle 100 is accelerating forward. For example, when accelerating, the traction motor may apply a forward torque as indicated by the arrow 486. However, due to the vehicle 100 having more mass than the wheel 236, the wheel 236 may tend to initially tend to move forward earlier or more quickly than the vehicle 100, which may result in an induced torque that may result in the wheel being toe in, with the front of the wheel 236 pointed toward the longitudinal axis 482 of the vehicle chassis 262. When operating correctly, the steering motor 234 may account for this tendency by applying a steering force away from the longitudinal axis 482. However, when the steering motor fails 234, this induced torque may not be corrected, which could lead to vehicle instability and an unsafe driving condition.

To counter this force, as indicated in FIG. 5B, the corrective steering system 126 may decrease the amount of torque provided by the traction motor 238 as depicted in FIG. 5B with a shorter arrow 486. This may cause the wheel 236 to rotate more slowly than the other wheels of the vehicle 100. Due to the kingpin offset 254, this may cause the wheel yaw to realign with the vehicle yaw. Specifically, decreasing the speed of one wheel 236 may cause that wheel 236 to rotate about a yaw axis, i.e., a vertical axis through the ball joint 246. That is, the corrective steering system 126 may cause the processor 372 to generate the corrective steering torque to be provided by the traction motor 238 such that the wheel yaw aligns towards the vehicle yaw. In the specific example depicted in FIGS. 5A and 5B, the corrective steering system 126 may cause the processor 372 to decrease the torque to the wheel 236 via the traction motor 238 responsive to the failure of the steering motor 234, which failure caused the front of the wheel 236 to point toward a longitudinal axis 482 of the vehicle 100. Note that as depicted in FIGS. 5A and 5B, the corrective steering torque may be supplemental to the torque already provided by the traction motor 238, as indicated by the presence of a torque arrow 486 in FIG. 5A and an alteration of the length of the arrow 486 in FIG. 5B.

Figure 6A:
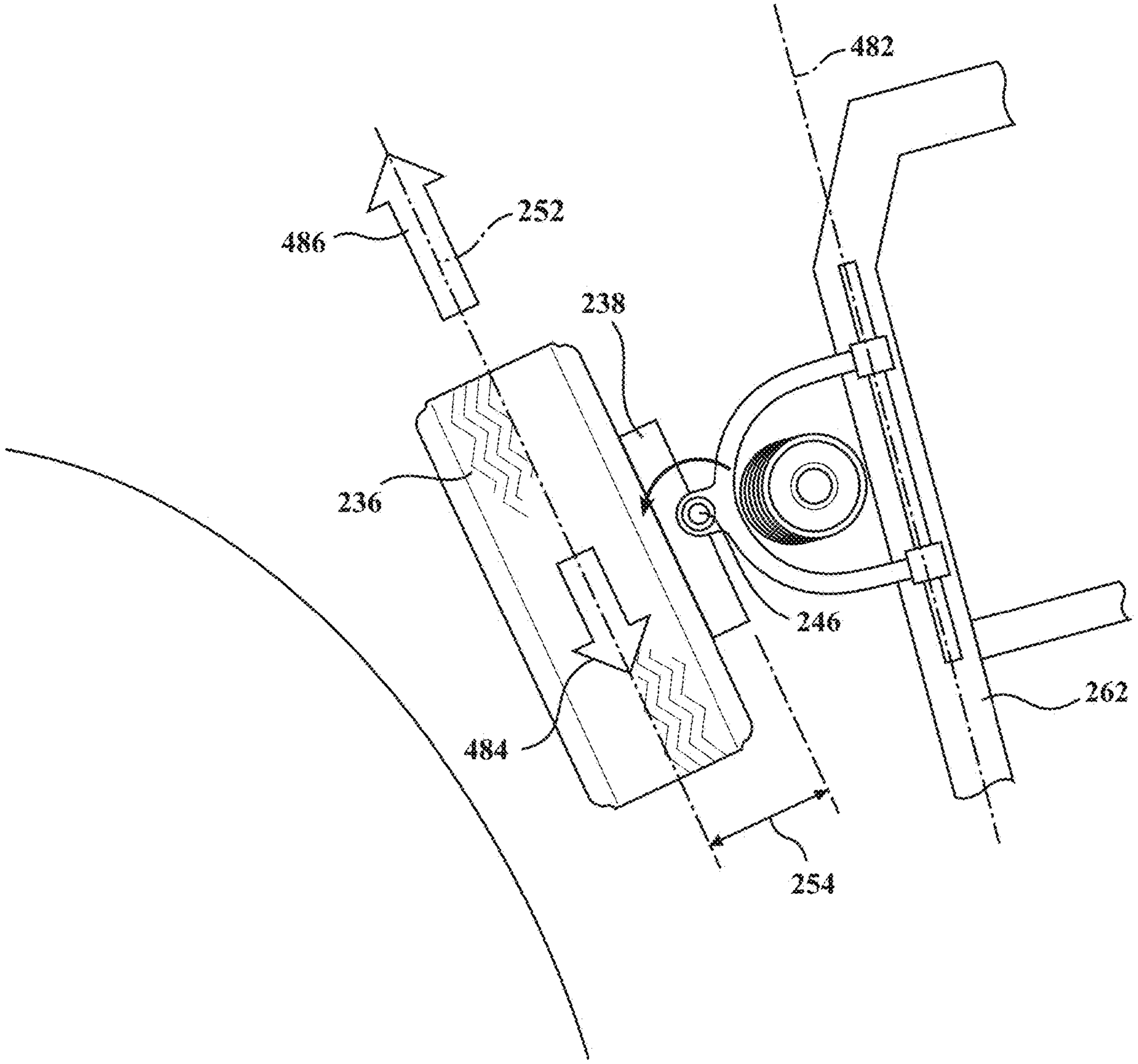
FIGS. 6A and 6B illustrate the correction, by a corrective steering system, of an independent in-wheel steering system following the failure of a steering motor.
Figure 6B:
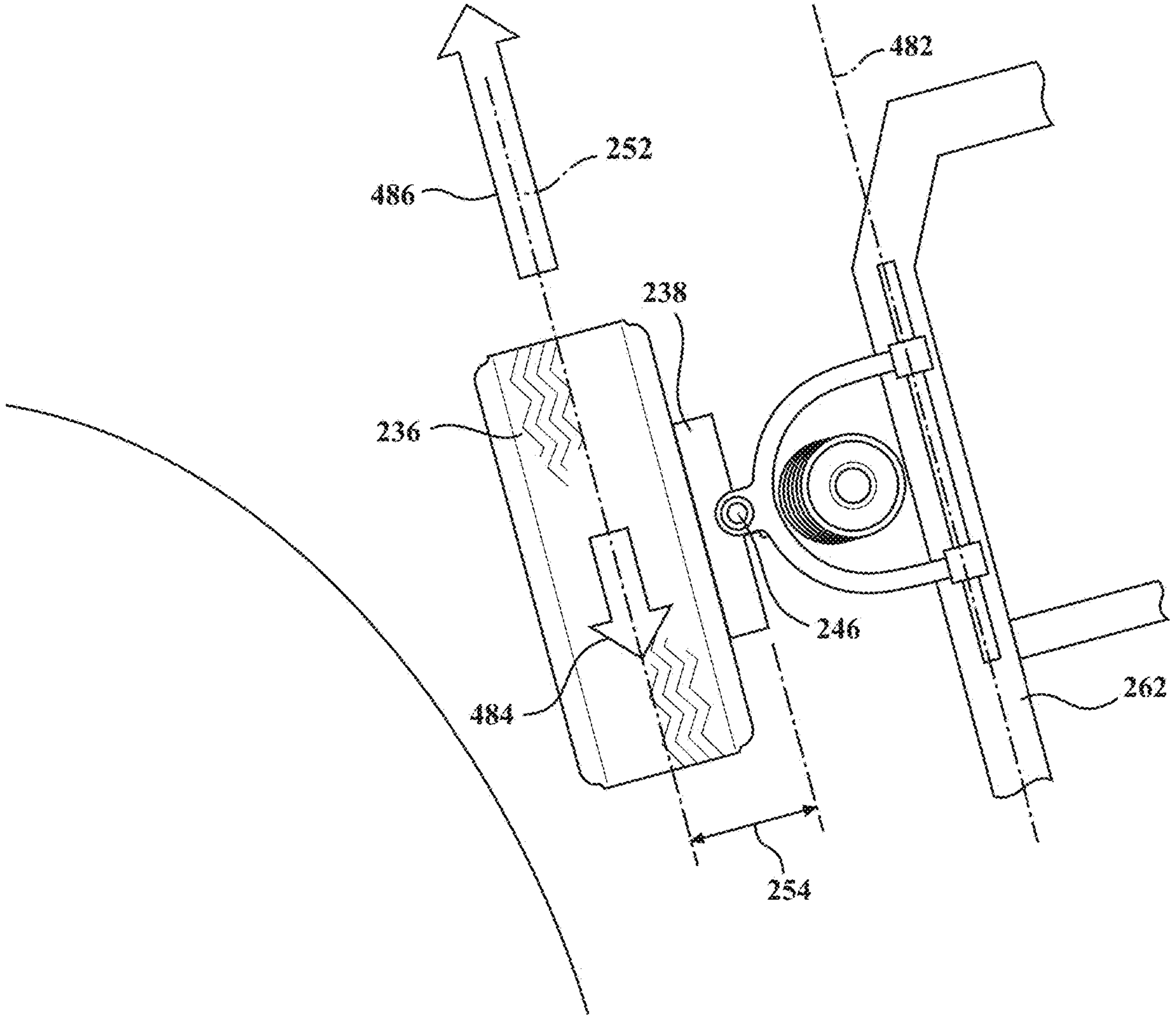

FIGS. 6A and 6B illustrate the correction, by a corrective steering system 126, of an independent in-wheel steering system following the failure of a steering motor 234. In the example depicted in FIGS. 6A and 6B, the vehicle 100, rather than driving straight, may be driving around a curve in a road. In the examples depicted in FIGS. 4A-5B, where the vehicle 100 is driving straight, the target steering motor angle against which a measured steering motor angle is compared is 0°. In the example depicted in FIGS. 6A and 6B, the target steering motor angle is a non-zero number that is determined based on a steering wheel 228 or ADAS input that is used to navigate the curved roadway. Still in this example, the failure detection module 376 may compare the measured steering angle as output from a steering angle sensor 232 to the non-zero target steering motor angle to detect steering motor 234 failure.

Under these conditions, as described above, a friction force, indicated by the arrow 484, may generate an induced torque that may result in the wheel being toe out, with the front of the wheel 236 pointed away from the longitudinal axis 482 of the vehicle chassis 262. To counter this force, as indicated in FIG. 6B, the corrective steering system 126 may increase the amount of torque provided by the traction motor 238 as depicted in FIG. 6B with a larger arrow 486. This may cause this wheel 236 to rotate faster than the other wheels, such that the wheel yaw aligns towards the vehicle yaw.

Figure 7:
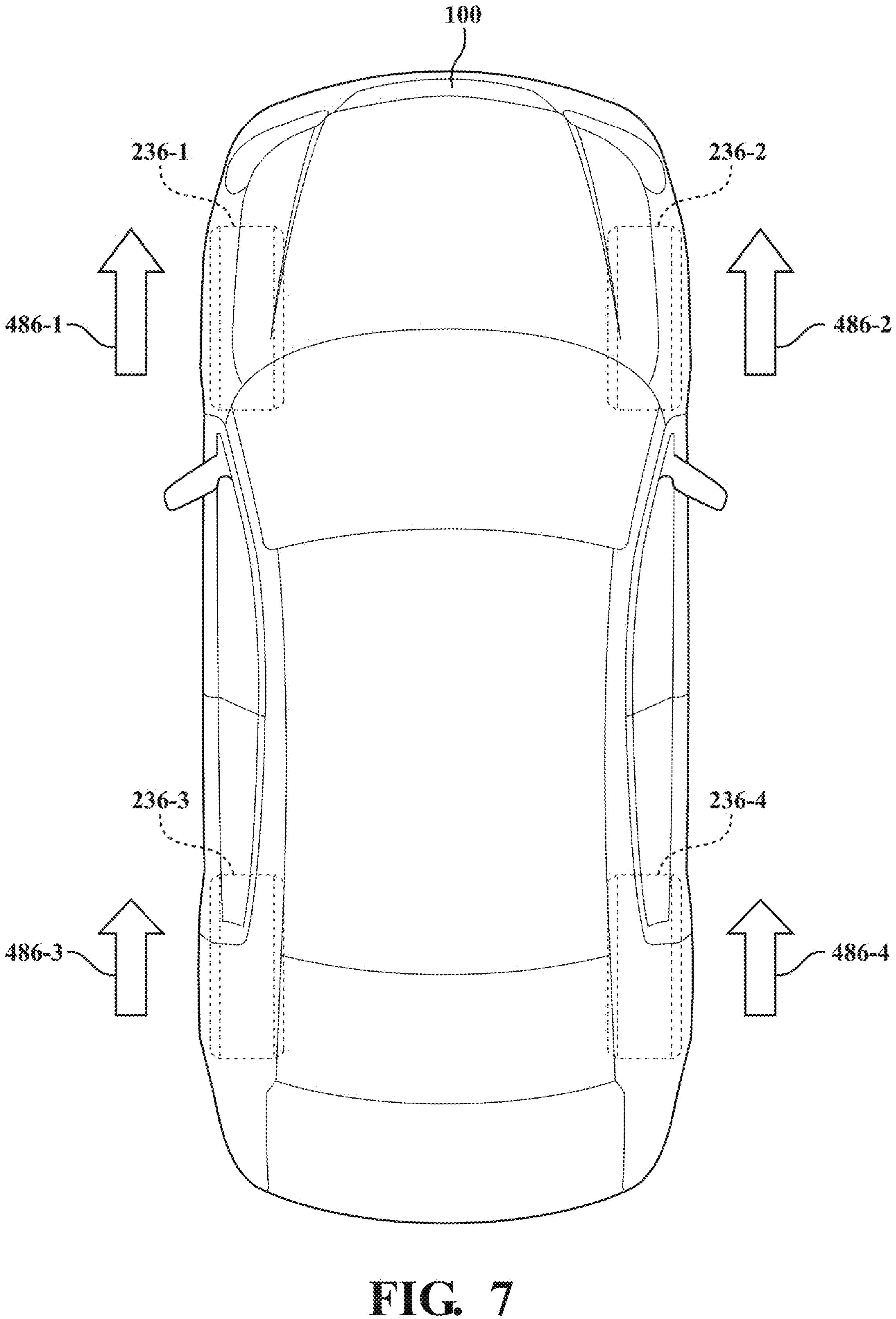
FIG. 7 illustrates the alteration of other in-wheel steering systems following the failure of a steering motor in a separate in-wheel steering system.

FIG. 7 illustrates the alteration of other in-wheel steering systems following the failure of a steering motor in a separate in-wheel steering system. That is, it may be that increasing the torque from a traction motor of a first wheel 236-1 may alter the operation of the vehicle 100. For example, given the failure of a steering motor 234 of the first wheel 236-1, the respective traction motor 238 may increase the torque output as indicated by the longer first arrow 486-1, which may alter the orientation of the first wheel 236-1 from a toe out orientation to an aligned orientation as depicted in FIGS. 4A and 4B. However, the increase in this torque may cause the vehicle 100 to speed up slightly on account of the increased propulsive drive. Moreover, while increasing the torque via the first wheel 236-1 traction motor 238 may induce a yaw moment on the vehicle 100 in general. Accordingly, in this example, the control module 380 may cause the processor 372 to adjust the torque of at least one other wheel to maintain the vehicle speed and to maintain the vehicle yaw.

For example, to offset the vehicle yaw induced by increasing the torque output of the traction motor 238 of the first wheel 236-1 by an amount, X, the torque output of the traction motor 238 of the second wheel 236-2 may also be increased by a commensurate amount, X, as indicated by the longer second arrow 486-2. This may reduce any yaw moment induced by increasing the torque of one front wheel 236. In this example, the torque output of the traction motor 238 of the third wheel 236-3 and the fourth wheel 236-4 may be maintained to prevent the vehicle 100 from speeding up as indicated by the arrows 486-3 and 486-4 being shorter than the arrows 486-1 and 486-2.

Note that while particular modifications of non-failed regions of the vehicle 100 are described herein (e.g., increasing traction torque to second wheel 236-2 to prevent vehicle yaw and maintaining traction torque to third and fourth wheels 236-3 and 236-4 to maintain a vehicle speed), other controls may be implemented. For example, to offset the vehicle yaw induced by increasing the torque output of the traction motor 238 of the first wheel 236-1 by an amount, X, the torque output of the traction motor 238 of the third wheel 236-3 may also be increased by a commensurate amount, X. In this example, the torque output of the traction motor 238 of the second wheel 236-2 and the fourth wheel 236-4 may be maintained so as to prevent the vehicle 100 from speeding up.

As yet another example, to offset the vehicle yaw induced by increasing the torque output of the traction motor 238 of the first wheel 236-1 by an amount, X, the torque output of the traction motor 238 of the fourth wheel 236-4 may also be increased by a commensurate amount, X. In this example, the torque output of the traction motor 238 of the second wheel 236-2 and the third wheel 236-3 may be maintained so as to prevent the vehicle 100 from speeding up.

As yet another example, to offset the vehicle yaw induced by increasing the torque output of the traction motor 238 of the first wheel 236-1 by an amount, X, the torque output of the traction motor 238 of the fourth wheel 236-4 and a traction motor 238 of the third wheel 236-3 may be increased by an amount X/2. In this example, the torque output of the traction motor 238 of the second wheel 236-2 may be maintained so as to prevent the vehicle 100 from speeding up.

In other words, in each of these examples, the total torque output change on all the wheels (i.e., the first wheel 236-1, the second wheel 236-2, the third wheel 236-3, and the fourth wheel 236-4 in FIG. 7) may be approximately zero to maintain vehicle 100 speed, presuming the driver intends to maintain speed.

Figure 8:
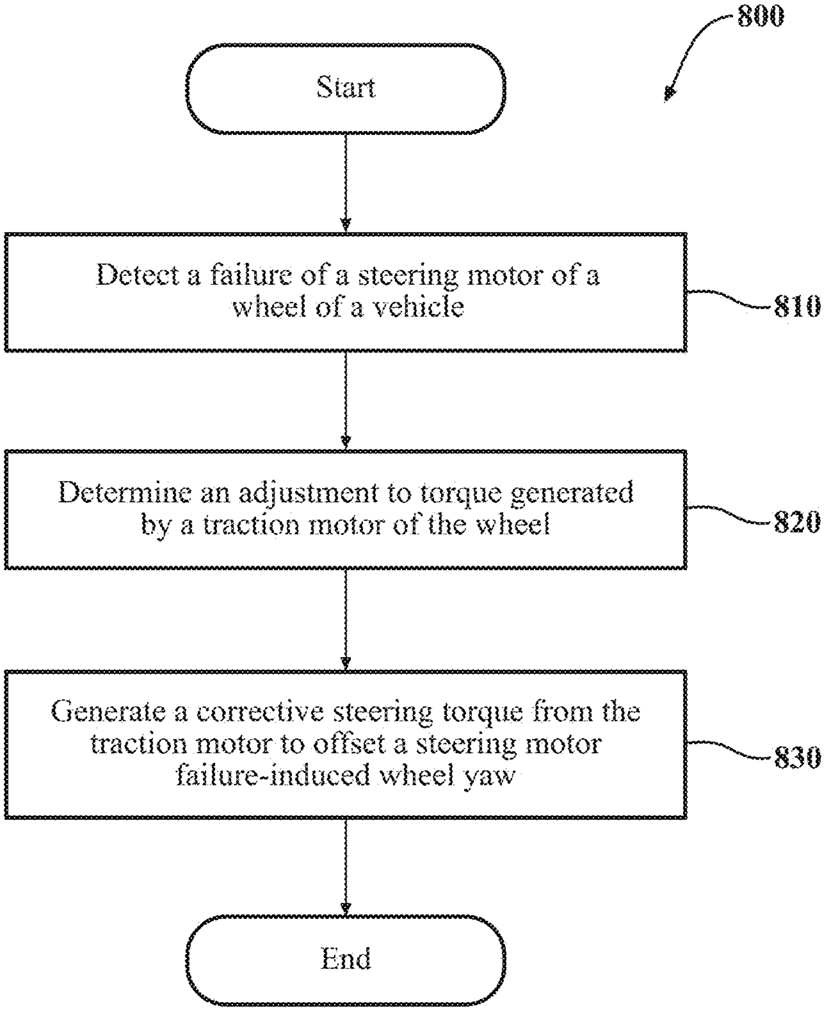
FIG. 8 illustrates a flowchart for one embodiment of a method that is associated with traction motor-based correction of a steering motor failure.

Additional aspects of correcting for steering motor failure will be discussed in relation to FIG. 8. FIG. 8 illustrates a flowchart of a method 800 that is associated with altering the torque provided by a traction motor 238 to supplant the yaw-correcting torque provided by a steering motor 234 that has failed. Method 800 will be discussed from the perspective of the corrective steering system 126 of FIGS. 1 and 3. While method 800 is discussed in combination with the corrective steering system 126, it should be appreciated that the method 800 is not limited to being implemented within the corrective steering system 126 but is instead one example of a system that may implement the method 800.

At 810, the failure detection module 376 detects a failure of the steering motor 234 of the wheel 236 on the vehicle 100. As described above, this may be based on the output of a steering angle sensor 232. Accordingly, the failure detection module 376 controls the sensor system 102 to acquire the sensor data 366. The failure detection module 376 may then compare the sensor data 366, specifically the output of the steering angle sensors 232, to a target steering motor angle to determine when the steering motor 234 is not correctly turning the associated wheel 236, indicating that the steering motor 234 has failed. In an example, the failure detection module 376 controls the sensors to acquire the sensor data 366 at successive iterations or time steps. Thus, the corrective steering system 126, in one embodiment, iteratively executes the functions discussed at blocks 810-830 to acquire the sensor data 366 and provide information therefrom.

At 820, the adjustment module 378 determines an adjustment to make to a traction motor 238 of the same wheel 236. That is, the adjustment module 378 may, based on sensor data 366 (such as vehicle speed, steering input, traction motor torque, steering motor torque, and road conditions, among others) and vehicle characteristics 368 (such as kingpin offset, vehicle weight, and wheel radius) determine how much of an increase or decrease of traction motor torque should be applied to offset the physical force-induced yaw torque that is now not controlled by the failed steering motor 234.

At 830, the control module 380 generates a corrective steering torque from the traction motor. As described above, the corrective steering torque can offset the wheel yaw induced by steering motor failure. That is, without the steering motor 234, the physical forces acting on a wheel 236 may cause the wheel 236 to toe in or toe out. The control module 380 can change the orientation of the wheel 236 from a toe-out or toe-in orientation to the desired orientation by increasing or decreasing the torque of the traction motor 238.

In addition to controlling the traction motor 238 to generate a desired alignment of the respective wheel 236, the corrective steering system 126 may further cause the processor 372 to generate an in-vehicle notification of the failure of the steering motor 234. That is, the corrective action of increasing the torque of the traction motor 238 to offset the failure of the steering motor 234 may be a temporary solution, and it may not be desirable to operate the vehicle 100 in this manner for an extended period. As another example, the torque of the traction motor 238 may have limits on its ability to provide steering torque, such that there may be certain maneuvers, such as 90-degree turns and U-turns, that a traction motor may not be able to facilitate. Accordingly, in this example, the notification may advise a vehicle operator of the state of the steering motor, allowing the operator to take remedial action, such as finding a repair shop or pulling over to the side of the road.

FIG. 9 illustrates a corrective steering system 126 that is associated with traction motor-based correction of a steering motor failure. As described above, the steering motor 234 may operate under the control of a steering motor controller 988. The steering motor controller 988 may receive a steering angle command, whether from an ADAS or a user input device such as a steering wheel 228. In either case, the steering angle command can be provided to a feedforward controller 990-1 of the steering motor controller 988, which may anticipate steering motor behavior. Specifically, the feedforward controller 990-1 of the steering motor controller 988 may include predetermined formulations based on a vehicle physics model of the vehicle 100 to predict the behavior of the steering motor 234 along a particular trajectory.

The steering angle command may also be provided to a feedback controller 992-1 of the steering motor controller 988. The feedback controller 992-1 may compare a measured wheel angle against the steering angle command. The output of the feedforward controller 990-1 and the feedback controller 992-1 of the steering motor controller 988 can be summed together to generate a command, which is provided to the steering motor 234. This generates the steering motor torque that turns the vehicle wheels 236 and knuckles 240.

The angle of the steering motor 234, the wheel 236, or the knuckle 240 is measured by the steering angle sensor 232. This output may be transmitted to the steering motor controller 988 for evaluation against a target steering motor angle (which is based on the steering angle command) to determine whether the steering motor 234 has failed. If the comparison indicates that the steering motor 234 has failed, generation of the steering torque may instead be provided by the traction motor 238. Specifically, rather than providing the steering angle command to the steering motor controller, the corrective steering system 126 may redirect the steering angle command to a traction motor controller 989.

Like the steering motor controller 988, the traction motor controller 989 may receive a steering angle command, whether from an ADAS or a user input device such as a steering wheel 228. The steering angle command can be provided to a feedforward controller 990-2 of the traction motor controller 989, which may anticipate the traction motor 238 behavior. Specifically, the feedforward controller 990-2 of the traction motor controller 989 may include predetermined formulations based on a vehicle physics model of the vehicle 100 to predict the behavior of the traction motor 238 along a particular trajectory.

The steering angle command may also be provided to a feedback controller 992-2 of the traction motor controller 989. The feedback controller 992-2 may compare a measured wheel angle against the steering angle command. The output of the feedforward controller 990-2 and the feedback controller 992-2 of the traction motor controller 989 can be summed together to generate a torque command, which is provided to the torque motor 238. This torque motor generates the traction motor torque that turns the vehicle wheels 236 and knuckles 240.

However, the traction motor torque command may be altered based on the radius, R, and the kingpin offset, Kp, which alteration may include converting, scaling, or otherwise adjusting the torque output so that it yields an equivalent result were the steering motor 234 functioning correctly.

Put another way, the corrective steering system 126 may control a steering motor controller 988 and a traction motor controller 989. This may eliminate the transmission of steering motor control information to the traction motor controller 989, which can be beneficial as implementing steering motor control and its tuned parameters (e.g., vehicle characteristics) within the traction motor controller 989 may be complex, costly, and increase the memory usage of the traction motor controller 989.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 101. In one or more arrangements, the processor(s) 101 can be a primary/centralized processor of the vehicle 100 or may be representative of many distributed processing units. For instance, the processor(s) 101 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 100.

The vehicle 100 can include one or more data stores 118 for storing one or more types of data. The data store 118 can be comprised of volatile and/or non-volatile memory. Examples of memory that may form the data store 118 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 118 is a component of the processor(s) 101. In general, the data store 118 is operatively connected to the processor(s) 101 for use thereby. The term "operatively connected," as used throughout this description, can include direct or indirect connections, including connections without direct physical contact.

In one or more arrangements, the one or more data stores 118 include various data elements to support functions of the vehicle 100, such as semi-autonomous and/or autonomous functions. Thus, the data store 118 may store map data 119 and/or sensor data 122. The map data 119 includes, in at least one approach, maps of one or more geographic areas. In some instances, the map data 119 can include information about roads (e.g., lane and/or road maps), traffic control devices, road markings, structures, features, and/or landmarks in the one or more geographic areas. The map data 119 may be characterized, in at least one approach, as a high-definition (HD) map that provides information for autonomous and/or semi-autonomous functions.

In one or more arrangements, the map data 119 can include one or more terrain maps 120. The terrain map(s) 120 can include information about the ground, terrain, roads, surfaces, and/or other features of one or more geographic areas. The terrain map(s) 120 can include elevation data in the one or more geographic areas. In one or more arrangements, the map data 119 includes one or more static obstacle maps 121. The static obstacle map(s) 121 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 122 is data provided from one or more sensors of the sensor system 102. Thus, the sensor data 122 may include observations of a surrounding environment of the vehicle 100 and/or information about the vehicle 100 itself. In some instances, one or more data stores 118 located onboard the vehicle 100 store at least a portion of the map data 119 and/or the sensor data 122. Alternatively, or in addition, at least a portion of the map data 119 and/or the sensor data 122 can be located in one or more data stores 118 that are located remotely from the vehicle 100.

As noted above, the vehicle 100 can include the sensor system 102. The sensor system 102 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 102 and/or the one or more sensors can be operatively connected to the processor(s) 101, the data store(s) 118, and/or another element of the vehicle 100.

Various examples of different types of sensors will be described herein. However, it will be understood that the embodiments are not limited to the particular sensors described. In various configurations, the sensor system 102 includes one or more vehicle sensors 103 and/or one or more environment sensors. The vehicle sensor(s) 103 function to sense information about the vehicle 100 itself. In one or more arrangements, the vehicle sensor(s) 103 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 102 can include one or more environment sensors 104 that sense a surrounding environment (e.g., external) of the vehicle 100 and/or, in at least one arrangement, an environment of a passenger cabin of the vehicle 100. For example, the one or more environment sensors 104 sense objects the surrounding environment of the vehicle 100. Such obstacles may be stationary objects and/or dynamic objects. Various examples of sensors of the sensor system 102 will be described herein. The example sensors may be part of the one or more environment sensors 104 and/or the one or more vehicle sensors 103. However, it will be understood that the embodiments are not limited to the particular sensors described. As an example, in one or more arrangements, the sensor system 102 includes one or more radar sensors 105, one or more LIDAR sensors 106, one or more sonar sensors 107 (e.g., ultrasonic sensors), and/or one or more cameras 108 (e.g., monocular, stereoscopic, RGB, infrared, etc.).

Continuing with the discussion of elements from FIG. 1, the vehicle 100 can include an input system 123. The input system 123 generally encompasses one or more devices that enable the acquisition of information by a machine from an outside source, such as an operator. The input system 123 can receive an input from a vehicle passenger (e.g., a driver/operator and/or a passenger). Additionally, in at least one configuration, the vehicle 100 includes an output system 124. The output system 124 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 109. Various examples of the one or more vehicle systems 109 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 110, a braking system 111, a steering system 112, a throttle system 113, a transmission system 114, a signaling system 115, and a navigation system 116.

The navigation system 116 can include one or more devices, applications, and/or combinations thereof to determine the geographic location of the vehicle 100 and/or to determine a travel route for the vehicle 100. The navigation system 116 can include one or more mapping applications to determine a travel route for the vehicle 100 according to, for example, the map data 119. The navigation system 116 may include or at least provide connection to a global positioning system, a local positioning system or a geolocation system.

In one or more configurations, the vehicle systems 109 function cooperatively with other components of the vehicle 100. For example, the processor(s) 101, the corrective steering system 126, and/or automated driving module(s) 125 can be operatively connected to communicate with the various vehicle systems 109 and/or individual components thereof. For example, the processor(s) 101 and/or the automated driving module(s) 125 can be in communication to send and/or receive information from the various vehicle systems 109 to control the navigation and/or maneuvering of the vehicle 100. The processor(s) 101, the corrective steering system 126, and/or the automated driving module(s) 125 may control some or all of these vehicle systems 109.

For example, when operating in the autonomous mode, the processor(s) 101 and/or the automated driving module(s) 125 control the heading and speed of the vehicle 100. The processor(s) 101 and/or the automated driving module(s) 125 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 117 in at least one configuration. The actuators 117 are, for example, elements operable to move and/or control a mechanism, such as one or more of the vehicle systems 109 or components thereof responsive to electronic signals or other inputs from the processor(s) 101 and/or the automated driving module(s) 125. The one or more actuators 117 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory machine-readable instructions that, when executed by the processor 101, implement one or more of the various functions described herein. In various arrangements, one or more of the modules are a component of the processor(s) 101, or one or more of the modules are executed on and/or distributed among other processing systems to which the processor(s) 101 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 125. The automated driving module(s) 125, in at least one approach, receive data from the sensor system 102 and/or other systems associated with the vehicle 100. In one or more arrangements, the automated driving module(s) 125 use such data to perceive a surrounding environment of the vehicle. The automated driving module(s) 125 determine a position of the vehicle 100 in the surrounding environment and map aspects of the surrounding environment. For example, the automated driving module(s) 125 determines the location of obstacles or other environmental features including traffic signs, trees, shrubs, neighboring vehicles, pedestrians, etc.

The automated driving module(s) 125 can be configured to determine travel path(s), current autonomous driving maneuvers for the vehicle 100, future autonomous driving maneuvers, and/or modifications to current autonomous driving maneuvers based on data acquired by the sensor system 102 and/or another source. In general, the automated driving module(s) 125 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a machine-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more machine-readable media having machine-readable program code embodied, e.g., stored, thereon. Any combination of one or more machine-readable media may be utilized. The phrase "machine-readable storage medium" means a non-transitory storage medium. A machine-readable storage medium may be, for example, but not limited to, an electronic, magnetic, optical, electromagnetic, infrared, or semiconductor system, apparatus, or device, or any suitable combination of the foregoing. A non-exhaustive list of the machine-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a machine-readable storage medium is, for example, a tangible medium that stores a program for use by or in connection with an instruction execution system, apparatus, or device.

Program code embodied on a machine-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing machine-readable instructions that, when executed by the processor, cause the processor to:

detect a failure of a steering motor of a wheel of a vehicle that has individual wheels driven by respective steering motors and traction motors, the failure alters a wheel yaw;

determine, responsive to the failure of the steering motor, an adjustment to torque generated by a traction motor of the wheel based on a vehicle characteristic; and generate a corrective steering torque on the wheel via the traction motor to offset a steering motor failure-induced wheel yaw.

2. The system of claim 1, wherein the machine-readable instruction that causes the processor to detect the failure of the steering motor of the wheel comprises a machine-readable instruction that causes the processor to detect the failure responsive to a measured steering motor angle being a threshold amount different than a target steering motor angle.

3. The system of claim 2, wherein the machine-readable instruction that causes the processor to generate the corrective steering torque on the wheel comprises a machine-readable instruction that causes the processor to incrementally alter a torque of the traction motor until the measured steering motor angle is within a threshold range of the target steering motor angle.

4. The system of claim 1, wherein the machine-readable instruction that causes the processor to generate the corrective steering torque on the wheel comprises a machine-readable instruction that causes the processor to generate the corrective steering torque such that the wheel yaw aligns towards a vehicle yaw.

5. The system of claim 1, wherein the machine-readable instruction that causes the processor to generate the corrective steering torque on the wheel comprises a machine-readable instruction that causes the processor to increase the torque to the wheel via the traction motor responsive to the failure of the steering motor causing a front of the wheel to point away from a longitudinal axis of the vehicle.

6. The system of claim 1, wherein the machine-readable instruction that causes the processor to generate the corrective steering torque on the wheel comprises a machine-readable instruction that causes the processor to decrease the torque to the wheel via the traction motor responsive to the failure of the steering motor causing a front of the wheel to point toward a longitudinal axis of the vehicle.

7. The system of claim 1, wherein the vehicle characteristic is at least one of:

a kingpin offset;

vehicle speed;

vehicle mass;

a classification of a tire;

a caster angle;

a road surface condition;

a steering motor torque;

a wheel radius; or a steering input from a steering wheel of the vehicle.

8. The system of claim 1, wherein the machine-readable instruction that causes the processor to determine the adjustment to torque generated by the traction motor comprises a machine-readable instruction that causes the processor to select the adjustment based on closed-loop feedback.

9. The system of claim 1, wherein the memory further comprises a machine-readable instruction that causes the processor to generate an in-vehicle notification of the failure of the steering motor.

10. The system of claim 1, wherein the memory further comprises a machine-readable instruction that causes the processor to adjust a torque of at least one other wheel to maintain a vehicle speed and to maintain a vehicle yaw.

11. The system of claim 1, wherein the vehicle comprises a right front steering motor, a right front traction motor, a left front steering motor, and a left front traction motor.

12. A non-transitory machine-readable medium comprising instructions that, when executed by a processor, cause the processor to:

detect a failure of a steering motor of a wheel of a vehicle that has individual wheels driven by respective steering motors and traction motors, a yaw pivot point of the wheel is offset from a center point of a wheel contact patch, such that the failure alters a wheel yaw;

determine, responsive to the failure of the steering motor, an adjustment to torque generated by a traction motor of the wheel based on a vehicle characteristic; and generate a corrective steering torque on the wheel via the traction motor to offset a steering motor failure-induced wheel yaw.

13. The non-transitory machine-readable medium of claim 12, wherein the instruction that causes the processor to detect the failure of the steering motor of the wheel comprises an instruction that causes the processor to detect the failure responsive to a measured steering motor angle being a threshold amount different than a target steering motor angle.

14. The non-transitory machine-readable medium of claim 13, wherein the instruction that causes the processor to generate the corrective steering torque on the wheel comprises an instruction that causes the processor to incrementally alter the torque of the traction motor until the measured steering motor angle is within a threshold range of the target steering motor angle.

15. The non-transitory machine-readable medium of claim 12, wherein the instruction that causes the processor to determine the adjustment to torque generated by the traction motor comprises a machine-readable instruction that causes the processor to select the adjustment based on closed-loop feedback.

16. The non-transitory machine-readable medium of claim 12, wherein the non-transitory machine-readable medium further comprises an instruction that causes the processor to adjust a torque of at least one other wheel to maintain a vehicle speed and to maintain a vehicle yaw.

17. A method, comprising:

detecting a failure of a steering motor of a wheel of a vehicle that has individual wheels driven by respective steering motors and traction motors, the failure alters a wheel yaw;

determining, responsive to the failure of the steering motor, an adjustment to torque generated by a traction motor of the wheel based on a vehicle characteristic; and generating a corrective steering torque on the wheel via the traction motor to offset a steering motor failure-induced wheel yaw.

18. The method of claim 17, wherein detecting the failure of the steering motor of the wheel comprises detecting the failure responsive to a measured steering motor angle being a threshold amount different than a target steering motor angle.

19. The method of claim 18, wherein altering the torque provided to the wheel comprises incrementally altering the torque of the traction motor until the measured steering motor angle is within a threshold range of the target steering motor angle.

20. The method of claim 17, wherein determining the adjustment to torque generated by the traction motor comprises selecting the adjustment based on closed-loop feedback.

* * * * *